United States Patent [19]

Géry et al.

[11] Patent Number: 4,620,566
[45] Date of Patent: Nov. 4, 1986

[54] DEVICE FOR PROTECTING A CONTAINER CONTAINING A PRESSURIZED FLUID

[75] Inventors: Alain Géry, Saint Avertin; Hubert Chantot, Paris; Francois Gemignani, Martigues, all of France

[73] Assignees: Electricite de France (S.N.), Paris; Societe d'Exploitation de Brevets pour l'Industrie et la Marine, Les Martigues, both of France

[21] Appl. No.: 445,517

[22] Filed: Nov. 30, 1982

[30] Foreign Application Priority Data

Dec. 3, 1981 [FR] France ............................... 81 22662

[51] Int. Cl.⁴ .................................................. E03B 65/72
[52] U.S. Cl. ..................................... 137/613; 137/488; 137/492; 376/283
[58] Field of Search .................. 137/488, 492, 613; 376/283

[56] References Cited

U.S. PATENT DOCUMENTS

| | | | |
|---|---|---|---|
| 3,100,504 | 8/1963 | Kauer, Jr. | 137/613 |
| 3,330,298 | 7/1967 | Allen. | |
| 3,754,566 | 8/1973 | Gemigniani | 137/488 |
| 4,057,077 | 11/1977 | Schabert et al. | 376/277 |
| 4,200,116 | 4/1980 | Gemigniani | 137/492 |
| 4,278,108 | 7/1981 | Casacci | 137/613 |
| 4,291,721 | 9/1981 | Gemignani | 137/492 |

FOREIGN PATENT DOCUMENTS

| | | |
|---|---|---|
| 2276665 | 1/1976 | France. |
| 2420701 | 10/1979 | France. |
| 2060982 | 5/1981 | United Kingdom. |

OTHER PUBLICATIONS

Copy of Novelty Report issued in corresponding French Appln. (priority document).

*Primary Examiner*—Deborah L. Kyle
*Assistant Examiner*—Richard W. Wendtland

[57] ABSTRACT

The invention relates to a device for protecting a container containing a pressurized fluid.

The device comprises a protection valve and an isolating valve, connected in series and whose opening is controlled by ancillary means, which are sensitive to two pressure thresholds in the container for successively controlling the opening of the isolating valve and then that of the protection valve, when the pressure rises. The isolating valve replaces the protection valve in the case where the latter becomes locked in the open position.

Application more particularly to the protection of primary circuits in a pressurized water nuclear reactor.

1 Claim, 1 Drawing Figure

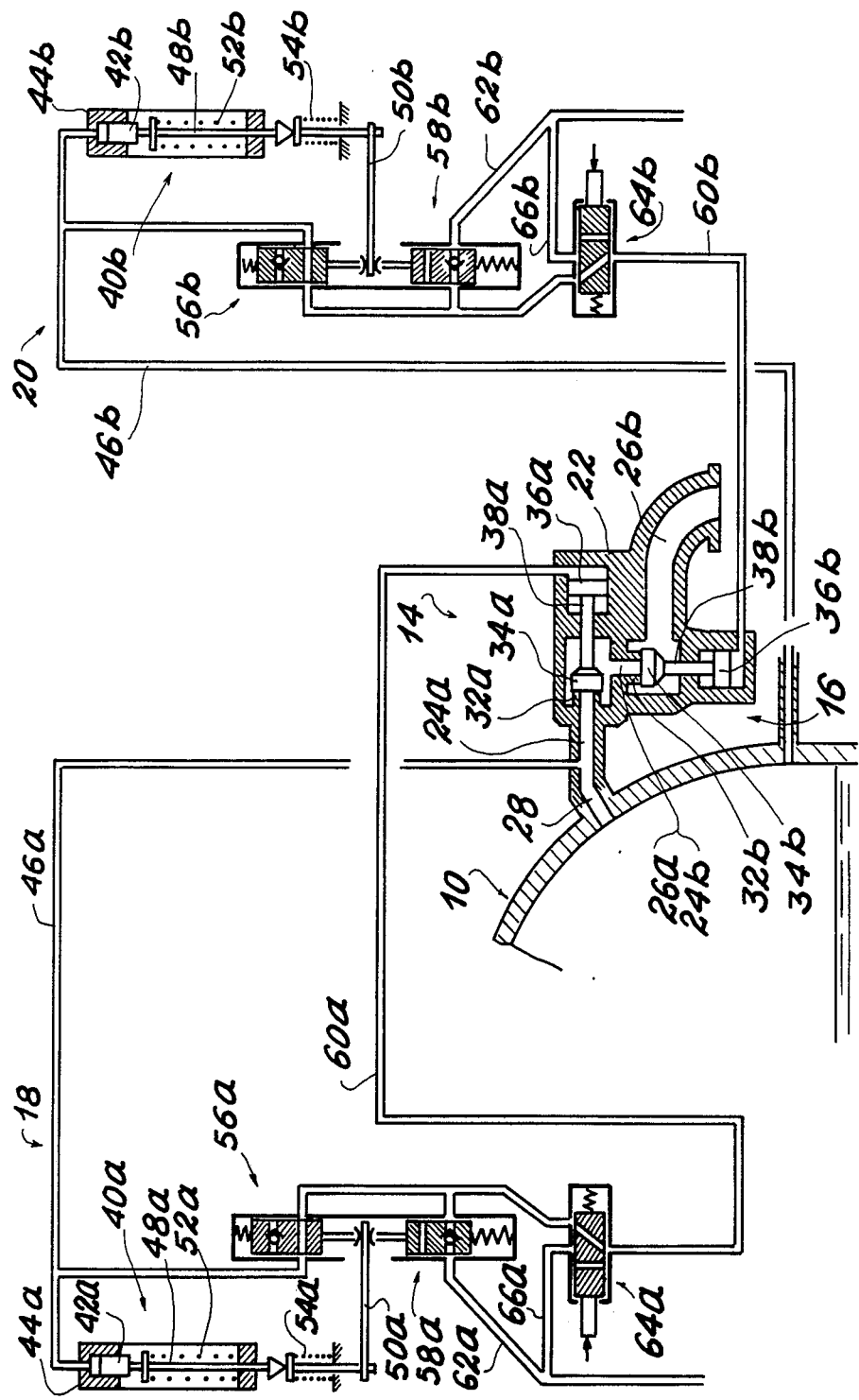

DEVICE FOR PROTECTING A CONTAINER CONTAINING A PRESSURIZED FLUID

BACKGROUND OF THE INVENTION

The present invention relates to a device for protecting a container containing a pressurized fluid. Such a device can in particular be used for protecting against overpressures a circuit or receptacle functioning under pressurized water or steam.

The invention is advantageously used in protecting the main primary circuits of pressurized water nuclear reactors. The device according to the invention can in particular be connected to the upper dome of the pressurizer associated with the primary circuit of such a reactor. However, it should be noted that the present device can be used for protecting other types of container.

At present, protection of the main primary circuit of a pressurized water nuclear reactor against overpressures involves the use of a certain number of elements, particularly discharge valves and safety valves with respect to the pressurizer, which have an essential function. More specifically, three spring-operated safety valves are used, each of them being connected to the upper dome of the pressurizer by a non-thermally insulated swan neck-shaped pipe, which makes it possible for a water plug to form upstream of the valves due to condensation. These valves are calibrated to 172 bars. In parallel, three discharge valves, which open on an all or nothing basis, with assisted pneumatic motorization and closing through shortage of air are connected to the upper dome of the pressurizer by pipes, whose arrangement also makes it possible to form a water plug by condensation. Two of these valves are calibrated at 162 bars, the third being controlled by a proportional integral derived control system. Upstream individual isolation of each discharge valve is provided by a motorized electrical valve, whose essential function is to permit the isolation of a discharge valve, which would lose its sealing effect.

Although the existing protection device is satisfactory on an overall basis, it still has certain disadvantages associated more particularly with the following problems:

the presently used safety valves operate unstably under certain conditions, there is a risk of a drift in the calibration points, and a risk of sealing loss, which makes it necessary to carry out highly disadvantageous checks and maintenance;

the existence of a water plug upstream of the safety valves leads to risks of flapping or swinging during the passage of said water plug and as a result said valve can be blocked in a more or less open position and if this situation is taken into account in safety analyses, it can lead to very serious consequences with regards to the operating material and the availability of the section;

the control of isolating valves and discharge valves is relatively complex through the need of ensuring the automatic closing of the isolating valves below a certain threshold, with the aim of limiting the consequences of depressurization by an untimely opening or non-closing of the discharge valves;

the isolating valves must be carefully checked after each operation under full flow, which represents a very unsatisfactory operating constraint;

the risk of failure on closing of safety valves has consequences, which may be considered acceptable from the safety standpoint, but which are sufficiently serious from the operating standpoint and the availability of the section, for the possibility of the isolation of these valves to be seriously considered.

In view of these various problems, it is desirable to have anovel device able to fulfil the same functions as the prior art devices, which can rapidly and automatically isolate a primary gap or break caused by an unsatisfactory reclosing of a safety valve and considerably reduce maintenance constraints with respect to the protective equipment of the primary circuit.

However, it is clear that even if the protective device according to the invention is particularly suitable for protecting the primary circuit of a pressurized water reactor, it can also be used in the protection of other than nuclear containers, particularly when it is desirable to automatically isolate a valve for increasing availability and reducing maintenance and work on important members and not for safety reasons.

BRIEF SUMMARY OF THE INVENTION

The present invention therefore specifically relates to a device for protecting a container containing a pressurized fluid, said device comprising a protection valve having at least one inlet communicating with the container and at least one outlet, a valve seat placed between the inlet and the outlet and a flap sensitive to a counterpressure and normally tightly bears against the seat, said device also comprising means which are sensitive to the pressure prevailing in the container for releasing the counterpressure when it exceeds a first predetermined threshold, wherein the outlet of the protection valve communicates with the inlet of an isolating valve similar to the protection valve, said second means sensitive to the prevailing pressure in the container being provided for releasing the counterpressure applied to the flap of the isolating valve, when said pressure exceeds a second predetermined threshold, which is lower than the first.

According to a second advantageous embodiment of the invention, the second threshold is slightly higher than the nominal pressure of the container and the second means controls the application of said counterpressure to the flap of the isolating valve, when the pressure in the container drops below a closing threshold which is lower than the nominal pressure.

According to another feature of the invention, the second means preferably comprise auxiliary control means able to release the counterpressure applied to the flap of the isolating valve, when the pressure prevailing in the container is below the second threshold.

DESCRIPTION OF THE DRAWING AND PREFERRED EMBODIMENT

The invention is described in greater detail hereinafter relative to a non-limitative embodiment and with reference to the attached diagrammatic drawing showing a protection device according to the invention connected to the upper dome of the pressurizer of the main primary circuits of a pressurized water nuclear reactor.

The drawing shows part of the dome of pressurizer 10 of the primary circuits of a pressurized water nuclear reactor, as well as a device for protecting these circuits in accordance with the present invention. In practice, three devices of this type are connected in parallel on a 900 MW reactor.

The protection device comprises a protection or discharge valve 14, an isolating valve 16, means 18 for controlling valve 14 and means 20 for controlling valve 16. According to the invention, valves 14 and 16 are connected in series between the upper dome 10 of the pressurizer and a collector of the discharge reservoir of the latter (not shown).

In the embodiment shown, valves 14 and 16 comprise a common body 22. As the valves are similar, the corresponding elements will be designated by the same reference numeral, to which is added either a or b, depending on whether it is a question of valve 14 or valve 16. Each valve has an inlet 24a and 24b and an outlet 26a, 26b. However, in view of the fact that these openings are provided in a common body, the inlet 24b of valve 16 coincides with outlet 26a of valve 14. Inlet 24a of valve 14 communicates the upper dome 10 of the pressurizer by a pipe 28. Finally, outlet 26b of valve 16 communicates with the collector of the discharge reservoir (not shown).

Obviously, in a not shown constructional variant, valves 14 and 16 could be made in two separate bodies, fixed to one another by flanging, in such a way that inlet 24b of valve 16 communicates with outlet 26a of valve 14.

Between the inlet and the outlet of each of the valves 14 and 16, body 22 defines a valve seat 32a, 32b on which normally tightly bears a flap 34a, 34b. Each of the flaps is connected to a piston 36a, 36b by a rod 38a, 38b. Each of the assemblies constituted by the flap, the rod and the piston slides in the body of the corresponding valve and is exposed to the opposing forces resulting from the pressure applied to the flap from the inlet and the counterpressure applied in the opposite direction to the piston by the corresponding control means 18, 20.

As will be seen, this counterpressure is the same as the pressure applied to the flap in the represented embodiment. Therefore, in order to keep the flap tightly engaging with the seat under normal operating conditions, the surface of the pistons to which the counterpressure is applied is given a larger size than the surface of the flaps to which is applied the pressure prevailing in the dome of the pressurizer. However, according to a not shown constructional variant, the counterpressure could be higher than the pressure applied to the flap, in such a way that these two surfaces could have identical dimensions.

Like valves 14 and 16, means 18 and 20 for controlling their operation are similar and, for simplification purposes, the elements used for forming the same are designated by the same reference numerals, followed by a or b, as a function of whether it is a question of means 18 or means 20.

Each of the control means 18, 20 firstly comprises a detector 40a, 40b having a piston 42a, 42b, slidingly mounted in a cylinder 44a, 44b, in such a way that one of the faces of the piston is sensitive to the pressure prevailing in the upper part of the dome 10 of the pressurizer, said pressure reaching it by a pipe 46a, 46b respectively. The other face of the piston is connected by a rod 48a, 48b to an operating bar 50a, 50b. A force opposite to the force exerted by the fluid pressure on the corresponding piston is exerted by an opposing spring 52a, 52b on each of the rods, so as to define for each of the detectors 40a, 40b a pressure threshold below which no movement of piston 42a, 42b occurs. A weakly calibrated compression spring 54a, 54b maintains each of the bars 50a, 50b in contact with the end of the corresponding rod 48a, 48b.

As a function of the position occupied by the corresponding piston, bar 50a, 50b of each of the detectors controls either the opening of a flap 56a, 56b, or the opening of a flap 58a, 58b. These flaps are diagrammatically shown in the drawing in the form of slides, but it is readily apparent that they can be constituted by flaps equipped with a tappet on which can bear the corresponding lever in order to permanently raise the flap from its seat.

Flap 56a, 56b is mounted in a pipe 60a, 60b connecting pipe 46a, 46b to the chamber of valve 14, 16 defined by the face of piston 36a, 36b to which the counterpressure must be applied. As illustrated in the drawing, bar 50a, 50b normally maintains flap 56a, 56b in the open position, when the pressure to be controlled is below the predetermined threshold beyond which the piston 42a, 42b of the corresponding detector moves in opposition to the force exerted by spring 52a, 52b. On exceeding this threshold, flap 56a, 56b prevents any flow of fluid from the pressurizer to the counterpressure chamber on the corresponding valve.

Valve 58a, 58b is placed on a pipe 62a, 62b branching from pipe 60a, 60b downstream of flap 56a, 56b. At its other end, pipe 62a, 62b communicates with a not shown drain device.

The control of flap 58a, 58b by bar 50a, 50b is the opposite to that of flap 56a, 56b. In other words and as illustrated in the drawing, when the threshold of detector 40a, 40b is not reached, the lever of the detector does not act on flap 50a, 50b and the latter then prevents any fluid flow from pipe 60a to the drain device. Conversely, when this threshold is reached, bar 50a, 50b permanently maintains flap 58a, 58b in the open position.

Finally, the drawing shows each of the control means 18 and 20 equipped with a three-way valve 64a, 64b making it possible to control, as required, the release of the counterpressure applied to the corresponding valve 14, 16 by connecting pipe 60a, 60b to drain pipe 62a, 62b downstream of flaps 56a, 56b and 58a, 58b no matter what the position occupied by detector 40a, 40b. When they are not actuated, it can be seen that the three-way valves 64a, 64b normally ensure the continuity of pipe 60a, 60b downstream of flap 56a, 56b. Conversely, when these three-way valves are actuated, they interrupt this communication and link the part of the pipe 60a, 60b downstream thereof with the part of pipes 62a, 62b downstream of flaps 58a, 58b by pipes 66a, 66b.

The control of each of these three-way valves 64a, 64b can be provided either by a push button, in the manner shown in the drawing, or by an electromagnetic control, or by both these control types. Under certain operating conditions, it may be possible to have a monostable manual control of valves 64a, 64b. This result can be obtained either by providing a mechanical locking of the said valves in the open position, or by equipping them with push buttons at two insertion levels, permitting as a function of the particular case, the valves to operate on a monostable or a bistable basis.

When the device described hereinbefore is used for protecting the primary circuits of a 900 MW pressurized water reactor, detectors 40a, 40b are only subject to a delay as a result of their calibration pressure. Thus, under nominal operating conditions, the pressure in the primary circuits is generally close to 155 bars. The opening threshold of valve 14 is then fixed either at 172 bars, when said valve equips a safety line, or at 162 bars when said valve equips the specialized discharge line. The closing pressure of the valve is then, as a function of the case, 169 or 159 bars.

With respect to the isolating valve 16, these opening and closing pressures are respectively fixed at 158 and 138 bars with the aid of detector 40b.

During the pressure rise in the primary circuit of the reactor, valves 14 and 16 are normally in the closed position under the action of the counterpressure acting on the corresponding pistons 36a, 36b, the control means 18, 20 then occupying the position shown in the drawing. In accordance with the prevailing regulations, it is still possible to control the opening of isolating valve 16 until the closing pressure thereof (138 bars) is reached. For this purpose, action then takes place on the three-way valve 64b for linking the counterpressure chamber of valve 16 to the drain. The automatic opening threshold of valve 16 (158 bars) is very slightly higher than the nominal operating pressure (155 bars), so that the opening of isolating valve 16 is voluntarily brought about by momentarily raising the pressure to said level in order that valve 16 is in the open position during the normal operation of the reactor. If such an operation is not voluntarily performed, it should be noted that it will be carried out automatically, as soon as the opening threshold of valve 16 (158 bars) is exceeded during a transient function leading either to the discharge on the specialized line calibrated to 162 bars, or the discharge on the safety lines calibrated to 172 bars, in the case of a fault on one of these lines.

When the pressure in the pressurizer rises above the opening pressure (162 or 172 bars) of valve 14, the latter opens when isolating valve 16 is already open. Thus, the pressure is instantaneously lowered in the pressurizer by connecting the upper part thereof to its discharge reservoir.

If for example, as a result of a failure of valve 14 it cannot close, the pressure drops to an exaggerated degree in the pressurizer, isolating valve 16 automatically closes at 138 bars and isolating valve 16 then becomes the line valve. As a result of the dead operating range of 20 bars of valve 16, the pressure in the pressurizer can rise to 158 bars without any opening of valve 16 taking place. Thus, the pressure in the primary circuit can assume its normal operating value of 155 bars. Valve 16 is then reopened in one of the two manner indicated hereinbefore, when the fault on the first valve 14 has been removed.

Obviously, the invention is not limited to the embodiment described in exemplified manner hereinbefore and in fact covers all variants thereof. Thus, the invention can be used in the protection of any circuit of enclosure requiring an automatic isolation below a particular pressure, no matter whether it is for safety reasons in the manner shown hereinbefore or for increasing availability and reducing maintenance and interventions on important parts.

What is claimed is:

1. A container having a pressurized fluid normally maintained at a given nominal pressure and means for relieving said pressurized fluid comprising a protection valve having at least one inlet communicating with the container and at least one outlet, a valve seat placed between said inlet and outlet and a flap sensitive to a counterpressure and normally tightly bearing against said seat, said device also comprising first means which are sensitive to the pressure prevailing in the container for releasing the counterpressure when said pressure exceeds a first predetermined opening threshold above said nominal pressure, said first means applying said counterpressure on said flap of said protection valve when the pressure prevailing in the container decreases below a first closure threshold higher than said nominal pressure, wherein the outlet of said protection valve communicates with the inlet of an isolating valve similar to said protection valve, second means sensitive to the prevailing pressure in the container being provided for releasing the counterpressure applied to the flap of said isolating valve, when said pressure exceeds a second predetermined opening threshold, which is lower than the first closure threshold and slightly higher than said nominal pressure, said second means applying said counterpressure on the flap of said isolating valve when the pressure prevailing in the container decreases below a second closure threshold lower than said nominal pressure.

* * * * *